(No Model.)
P. J. WHITE.
TANK FOR SANITARY BASINS.
No. 413,590. Patented Oct. 22, 1889.
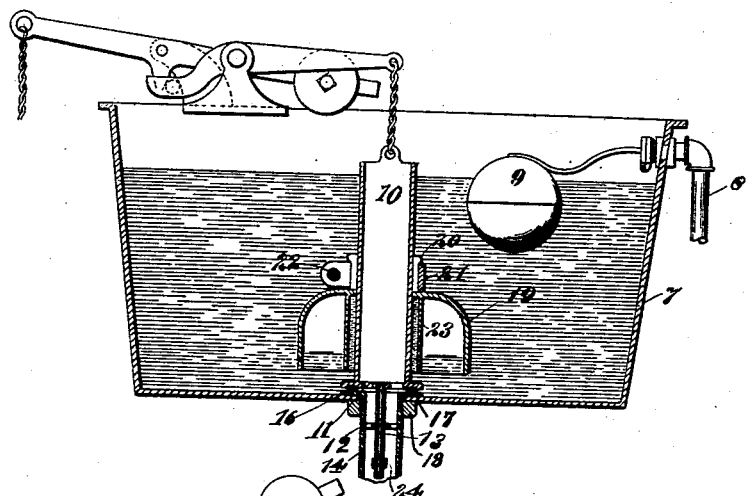
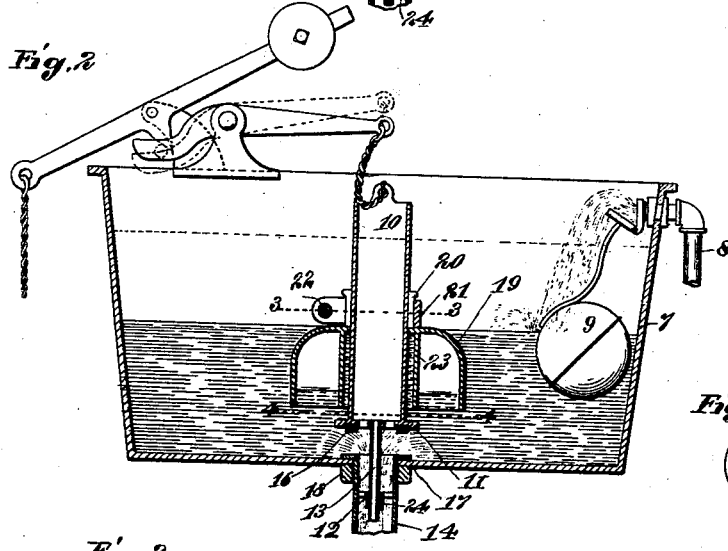
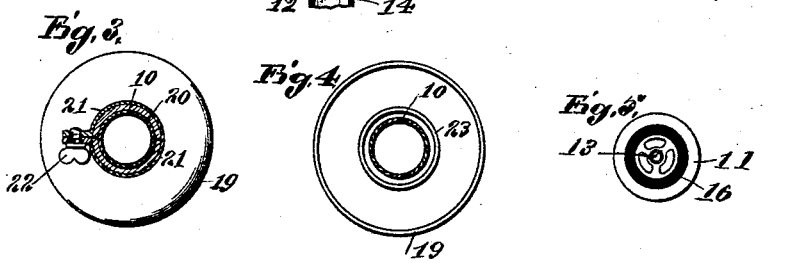
Witnesses:
G. A. Hinchman Jr.
W. H. Cutting.
Inventor:
Patrick J. White,
By Fowler & Fowler
Attorneys.

UNITED STATES PATENT OFFICE.

PATRICK J. WHITE, OF ST. LOUIS, MISSOURI.

TANK FOR SANITARY BASINS.

SPECIFICATION forming part of Letters Patent No. 413,590, dated October 22, 1889.

Application filed December 19, 1888. Serial No. 294,027. (No model.)

*To all whom it may concern:*

Be it known that I, PATRICK J. WHITE, a citizen of the United States, residing at St. Louis, in the State of Missouri, have invented certain new and useful Improvements in Tanks for Sanitary Basins, of which the following is such a full, clear, and exact description as will enable any one skilled in the art to which it appertains to make and use the same, reference being had to the accompanying drawings, forming part of this specification.

My invention relates to the valve controlling the discharge from such tanks.

The object of my invention is to render said valves adjustable, so that the discharge from the tank can be regulated.

The invention has also for its object to render such valves more reliable in operation, to simplify their construction, and thereby to cheapen their manufacture.

The invention consists of a float-valve of peculiar construction, which is air-tight at all times, and which may preferably be adjusted along the overflow-tube, so as to regulate the discharge of the tank.

Figure 1 shows a vertical section of a tank for sanitary basins having a valve made in accordance with my invention. Fig. 2 is the same showing the parts in a different position. Fig. 3 is a sectional plan of the valve on the line 3 3 of Fig. 2, and Fig. 4 is a sectional bottom view on the line 4 4 of Fig. 2; and Figs. 5 and 6 are plans of details.

The same figures of reference indicate the same parts throughout the various views.

7 is a tank, which may be of any shape and dimensions.

8 is the inlet-pipe for said tank. The inlet is controlled by a float-valve 9, of any suitable kind, which rises and falls with the water-level in the tank and opens or closes the inlet, so as to cut off or admit water into the tank.

10 is the overflow-tube, which is made with an open top, over which an excess of water in the tank may flow. Upon this overflow-tube is preferably secured the float-valve for regulating the discharge from the tank. At the lower end of the overflow-tube 10 is affixed a slotted disk 11, to which is attached a rod or tube 13, that projects into the discharge-pipe 14 at the bottom of the tank, and is guided by a cross-piece 12 in said discharge-pipe. The end of the tube or rod 13 has a nut 24, which is adapted to come against the cross-piece 12 and act as a stop for the valve, so as to prevent it from being raised too far off of its seat. The bottom of the overflow-tube is thus left open, so that the overflow may pass through said tube to the discharge-pipe 14. Upon the slotted disk 11 is a gasket or washer 16, of rubber or any other suitable material, which, when the valve is closed, comes against a flange 17 of the discharge-pipe 14, so as to prevent leakage between the valve and its seat. The discharge-pipe 14 is held tightly to the bottom of the tank by a nut 18, which engages a screw-thread on said discharge-tube. To the overflow-tube 10 I also preferably affix my float, which consists of an inverted cup 19, which has soldered to its top a split ring 20, that embraces the discharge-tube 10, and is itself encircled by an open ring 21, the two extended ends of which are secured together by a thumb-screw 22. By tightening said thumb-screw the cup 19, carried by the split ring 20, can be adjusted along the overflow-tube 10 to regulate the discharge of water from the tank. Within the cup 19 is a cylinder 23, which is concentric with the overflow-tube 10 and of the same height as said cup 19, to which it is brazed at its upper edge, so that the space between the cup 19 and the cylinder 23 is absolutely air-tight when said cup has its edges submerged in the water. The purpose of using the cylinder 23 is to more readily make the cup air-tight, for the joint between the cup 19, split ring 20, and overflow-tube 10 cannot well be made air-tight when said cup is made adjustable along the overflow-tube, as described.

Any suitable devices adapted to be operated by hand are connected with the overflow-tube 10 to raise the valve and cause a discharge from the tank. These devices for raising the valve are old and well known and make no part of my invention.

Fig. 1 shows the normal position of parts—that is, when the valve is upon its seat. When lifted, as in Fig. 2, it remains buoyed up by the water in the tank, and the discharge takes place from the tank until the water-level reaches a point where the buoyancy of the float is destroyed—that is, to where the weight of water displaced by the float is less than the weight of the float—whereupon it sinks, going down as the water-level falls until the valve strikes against its seat and checks the flow of water from the tank. At the same time, or previous thereto, the float-valve 9 is brought into operation to open the inlet-pipe 8 and supply water to the tank. After the discharge-controlling valve comes to its seat the water will continue to flow in the tank through the inlet-pipe 8, and will raise the water-level thereof until the float 9 closes the inlet. By adjusting the float along the overflow-tube 10 the valve can be made to seat sooner or later, as the case may be. If, for instance, the cup 19 be arranged nearer the top of the overflow-tube 10, the water-level in the tank as the said tank discharges will reach the float just so much sooner, and it will begin to sink and seat itself just so much earlier, thus cutting off the discharge of water from the tank sooner. On the other hand, if the cup 19 be placed at the lower end of the overflow tube 10, the amount of water discharged from the tank will be greater, for the water-level in said tank will be just so much longer reaching the float, and said float cannot sink and close the discharge until the water-level reaches or comes near the float. The amount of water discharged will be directly proportional to the distance of the normal water-level of the water in the tank above the top of the float when in its seated position, (see Fig. 1,) and the amount of water retained in the tank after the seating of the valve will be proportional to the distance of the top of the float in its normal position above the bottom of the tank. Thus it will be evident that the higher up the float is placed on the tube 10 the less water will be discharged and the greater the amount of water retained in the tank after the discharge is cut off by the seating of the valve, and, conversely, the lower down upon the tube the valve is placed the greater will be the amount of water discharged from the tank and the less the amount of water retained in said tank. The discharge-controlling float is made so as to have no tendency to rise of itself, and as the water-level rises will be firmly held to its seat by the head of water above said seat. The adjustability of the float permits me to regulate the discharge from the tank, which is a desirable feature, in that some basins require a greater discharge than others, and it also permits one to limit the amount of water discharged where the water-supply is not abundant.

It will be noted that my float-valve is airtight at all times, and thus said valve always has a constant weight, differing from other valves as now generally constructed for a like purpose in that said valves are arranged so that when they are lifted up the air is discharged from the float and said float gradually fills with water, which finally causes it to sink and seat itself, whereupon the water is discharged from said float and it is again filled with air after having come to its seat. These latter-mentioned valves, therefore, regulate the discharge from the tank by the rate at which the air is expelled from the float by the water, whereas in my invention the discharge is regulated by the approach of the water-line to the float. An objection to these previously-constructed valves is, that when they are operated and the float fills with water the valve cannot be operated again to effect much of a discharge from the tank until the float has discharged its water, except said float be held in its raised position by some extraneous force, for such floats will immediately sink after being actuated a second time, while my valve can be manipulated in rapid succession without affecting its operation. In valves as now generally constructed the float or valve has also a large seating area, the whole lower part of the float seating itself upon the valve-seat, and when a valve is so seated just so much buoyant area is cut off from the float, so that when the same is seated it is held with great force to its seat, and when lifted up it has a greatly-increased buoyancy, whereas my valve seats only upon the gasket 16, leaving the area of the float presented to the water practically the same, thus making the buoyancy of my float practically constant. In these previously-constructed valves the valve would seat upon the bottom of the tank at the edges referred to of the cup 19, whereby when the edges of said cup were against the bottom of the tank the buoyant pressure of the water which would naturally be exerted against the under side of the cup is removed and the valve is held down by the head of water above the float, so that when such a valve is operated it has to be lifted from its seat with more or less force. To overcome the increase of buoyancy when the valve is raised, it is necessary to adapt the float when raised to fill with water so as to sink it and reseat the valve. My float, however, has none of these characteristics, in that it always has practically the same buoyancy, and in that it is of constant weight and does not depend upon having the water change the weight of the float to close the valve. My valve at the same time seats with sufficient force to prevent leakage from the tank and is held firmly to its seat by the column of water above it, but is not held so firmly to its seat as to require great force to lift it therefrom, and hence is more easily manipulated than floats of the character alluded to.

Having fully set forth my improved float-valve and explained the advantages thereof, what I desire to claim, and secure by Letters Patent of the United States as my invention, is—

1. The combination, with a tank for sanitary basins, of a float governing the discharge thereof, an overflow-tube 10, to which said float is secured, a split ring 20, soldered to the float, and an open ring 21, for securing said float to said overflow-pipe at any point along the same.

2. The combination, with a tank for sanitary basins, of an overflow-tube 10, a valve at the lower end of said tube controlling the discharge from said tank, and an adjustable inverted cup 19, secured to said overflow-tube above said valve.

3. The combination, with a tank for sanitary basins of the character described, of the overflow-tube 10, the valve carried at the lower end thereof, the inverted cup 19, secured to said tube above said valve, the cylinder 23 in said cup making an air-tight joint with the same, the split ring 20, secured to the upper part of said cup, an open ring 21, embracing said split ring 20, a set-screw 22, for drawing the ends of said open ring 21 together and securing the float to said tube 10 at any point along the same, and a guide-rod 13 for said valve, substantially as set forth.

4. The combination, with a tank for sanitary basins, of an overflow-tube, a valve at the lower end of said tube controlling the discharge from said tank, an inverted cup 19, completely submerged in the water in said tank, governing said valve and fixed to said overflow-tube near the lower end thereof above the valve, thereby permitting the discharge to take place from the tank only when the float and valve are raised by extraneous force, a cylinder 23 in said cup embracing the overflow-tube and making an air-tight joint with said overflow-tube and cup, for the purpose described.

In testimony whereof I have hereunto set my hand and affixed my seal, this 15th day of December, 1888, in the presence of two subscribing witnesses.

PATRICK J. WHITE. [L. S.]

Witnesses:
A. C. FOWLER,
M. S. REEDER.